(12) United States Patent
Hill

(10) Patent No.: US 10,757,912 B2
(45) Date of Patent: Sep. 1, 2020

(54) MOBILE PET FEEDER

(71) Applicant: Alex Hill, Duluth, GA (US)

(72) Inventor: Alex Hill, Duluth, GA (US)

(*) Notice: Subject to any disclaimer, the term of this patent is extended or adjusted under 35 U.S.C. 154(b) by 184 days.

(21) Appl. No.: 16/108,095

(22) Filed: Aug. 21, 2018

(65) Prior Publication Data

US 2019/0053463 A1    Feb. 21, 2019

Related U.S. Application Data

(60) Provisional application No. 62/548,349, filed on Aug. 21, 2017.

(51) Int. Cl.
| *A01K 1/00* | (2006.01) |
| *A01K 1/035* | (2006.01) |
| *A01K 5/02* | (2006.01) |
| *A01K 7/06* | (2006.01) |
| *A01K 5/01* | (2006.01) |

(52) U.S. Cl.
CPC ............ *A01K 1/035* (2013.01); *A01K 5/0114* (2013.01); *A01K 5/0135* (2013.01); *A01K 5/0225* (2013.01); *A01K 7/06* (2013.01)

(58) Field of Classification Search
CPC ........ A01K 1/035; A01K 1/03; A01K 1/0353; A01K 5/00; A01K 7/00; A01K 7/005
USPC .... 119/51.01, 51.5, 52.1, 54, 53, 53.5, 56.1, 119/72, 72.5
See application file for complete search history.

(56) References Cited

U.S. PATENT DOCUMENTS

| 8,272,350 B1* | 9/2012 | England ................. A01K 5/025 119/52.1 |
| 2006/0196433 A1* | 9/2006 | Ness ..................... A01K 5/0114 119/52.1 |
| 2011/0297092 A1* | 12/2011 | Lato ..................... A01K 5/0225 119/53 |
| 2015/0313178 A1* | 11/2015 | Witney .................... A01K 5/02 119/51.11 |

* cited by examiner

*Primary Examiner* — Richard T Price, Jr.
(74) *Attorney, Agent, or Firm* — Charlena Thorpe, Esq.; Incorporating Innovation LLC

(57) ABSTRACT

Implementations of a mobile pet feeder are provided. In some implementations, the mobile pet feeder comprises a water container, a holder, an upper strap, and a lower strap. In some implementations, a method of using the mobile pet feeder comprises positioning and attaching the mobile pet feeder to the back side of a seat of a vehicle.

15 Claims, 9 Drawing Sheets

MOBILE PET FEEDER

CROSS REFERENCE TO RELATED APPLICATION

This application claims the benefit of U.S. Patent Application Ser. No. 62/548,349, which was filed on Aug. 21, 2017, and is incorporated herein by reference in its entirety.

TECHNICAL FIELD

This disclosure relates to implementations of a mobile pet feeder.

BACKGROUND

Pets, such as dogs or cats, are often carried for a ride in a vehicle, such as a car or sports utility vehicle (SUV). Such pets often need to eat food and drink water while riding in the vehicle, particularly for long rides. Therefore, it may be desirable to feed such pets food and water while riding in the vehicle.

However, it is desirable to feed such pets while riding in the vehicle without causing a mess from spillage of the food or water. There does not exist a device specifically designed for feeding pets in this manner.

DETAILED DESCRIPTION

Implementations of a mobile pet feeder are provided. In some implementations, the mobile pet feeder comprises a water container, a holder, an upper strap, and a lower strap.

In some implementations, a method of using the mobile pet feeder comprises positioning and attaching the mobile pet feeder to the back side of a seat of a vehicle.

In some implementations, the mobile pet feeder is configured to be positioned on a seat of a vehicle. In some implementations, the mobile pet feeder is configured to be attached to the seat of the vehicle.

In some implementations, the mobile pet feeder is configured to hold food for a pet. In some implementations, the mobile pet feeder is configured to hold water for the pet.

In some implementations, the mobile pet feeder is configured to dispense the food to feed the pet. In some implementations, the mobile pet feeder is configured to dispense the water to feed the pet.

In this way, in some implementations, the mobile pet feeder holds food and water for a pet while the mobile pet feeder is positioned and attached to the seat of a vehicle. Furthermore in this way, in some implementations, the mobile pet feeder dispenses the food and water to feed the pet while riding in the vehicle without causing a mess from spillage.

Figure 1A:
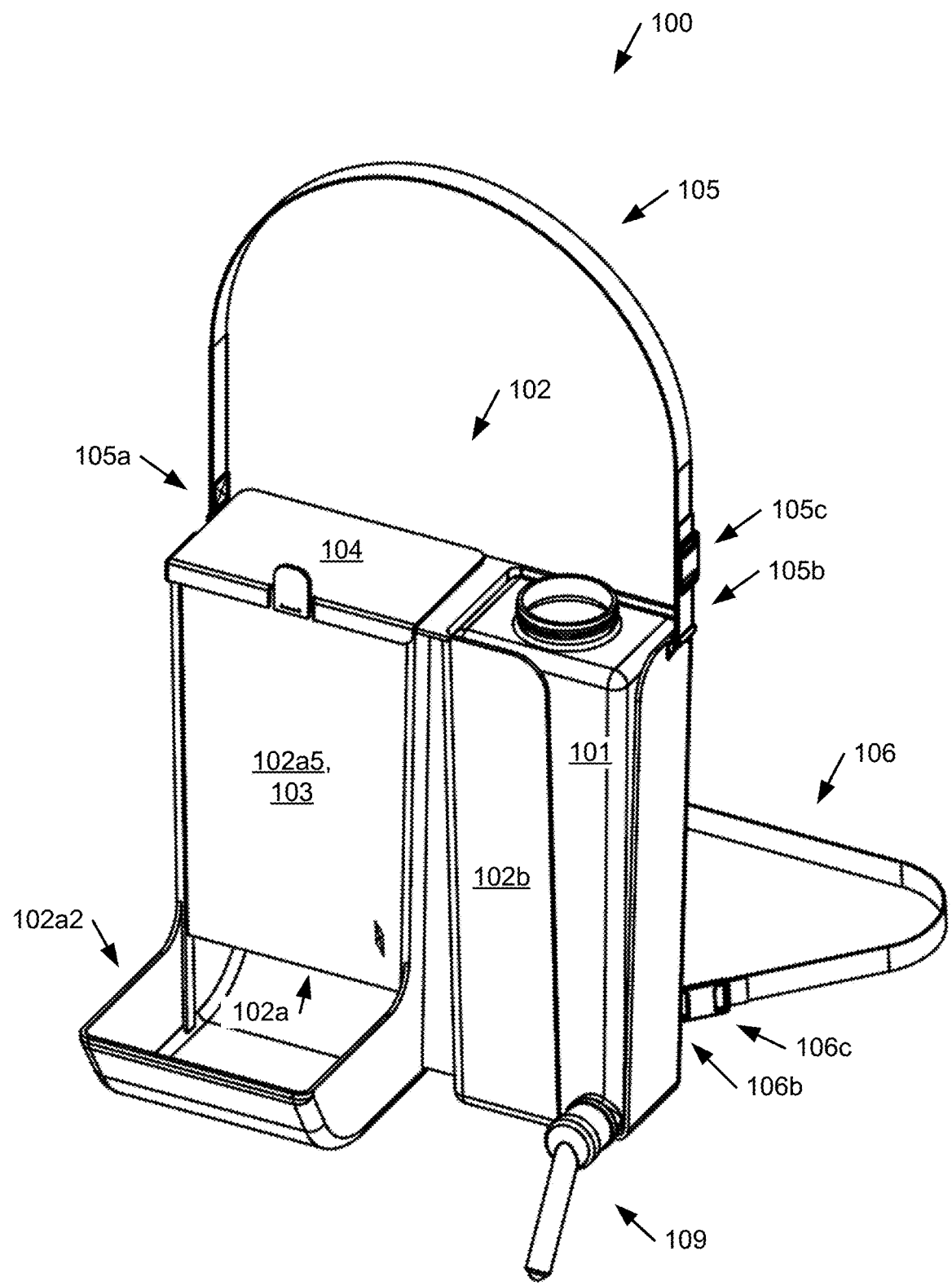
FIG. 1A illustrates an implementation of an example mobile pet feeder according to the present disclosure.
Figure 1B:
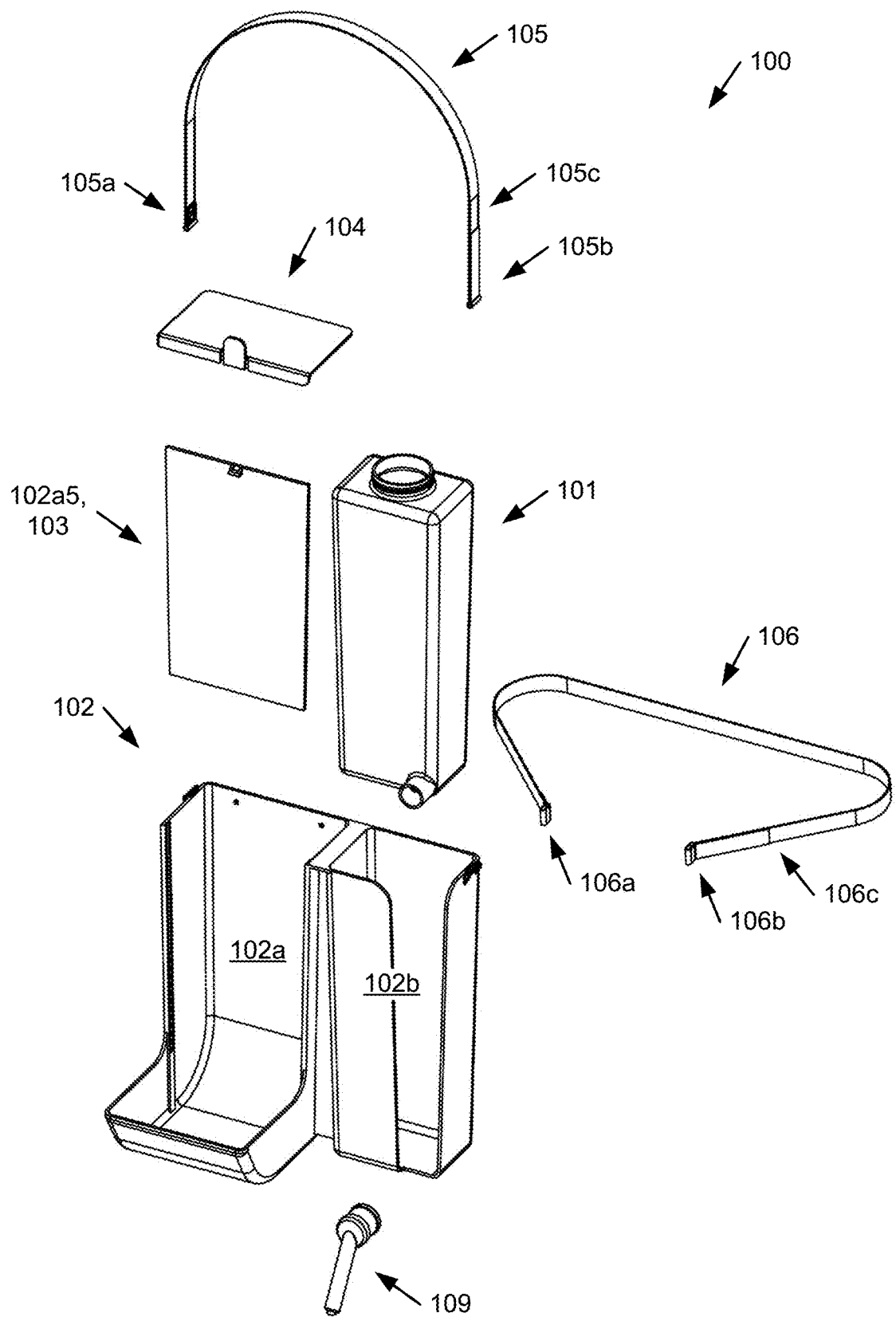
FIG. 1B illustrates an exploded view of the example mobile pet feeder shown in FIG. 1A.

FIGS. 1A and 1B illustrate an implementation of an example mobile pet feeder 100 according to the present disclosure. In some implementations, the mobile pet feeder 100 comprises a water container 101, a holder 102, an upper strap 105, and a lower strap 106.

Although the mobile pet feeder 100 and/or components of the mobile pet feeder 100 may be described and/or shown to have a particular shape or other configuration, the mobile pet feeder 100 and/or the components of the mobile pet feeder 100 may have any other suitable configuration.

In some implementations, as shown in FIGS. 1A and 5-8, the mobile pet feeder 100 is configured to be positioned on a seat 154 of a vehicle by the upper strap 105 of the mobile pet feeder 100. In some implementations, the mobile pet feeder 100 is configured to be positioned on a seat 154 of a vehicle by the lower strap 106 of the mobile pet feeder 100.

In some implementations, the mobile pet feeder 100 is configured to be attached to a seat 154 of a vehicle by the upper strap 105 of the mobile pet feeder 100. In some implementations, the mobile pet feeder 100 is configured to be attached to a seat 154 of a vehicle by the lower strap 106 of the mobile pet feeder 100.

In some implementations, the mobile pet feeder 100 is configured to hold food for a pet in a vehicle. In some implementations, the mobile pet feeder 100 is configured to hold water for a pet in a vehicle.

In some implementations, the mobile pet feeder 100 is configured to dispense food to a pet in a vehicle. In some implementations, the mobile pet feeder 100 is configured to dispense water to a pet in a vehicle.

In some implementations, the pet is a dog or cat. In some implementations, the pet is any other suitable pet.

In some implementations, food for a pet can be any suitable food that an applicable pet can eat, such as but not limited to typical pet food for dogs, cats, etc.

In some implementations, the vehicle is a car, sports utility vehicle (SUV), mini-van, or truck. In some implementations, the vehicle is any other suitable vehicle.

In some implementations, the mobile pet feeder 100 is used to dispense food and water to a pet in a vehicle.

Figure 2:
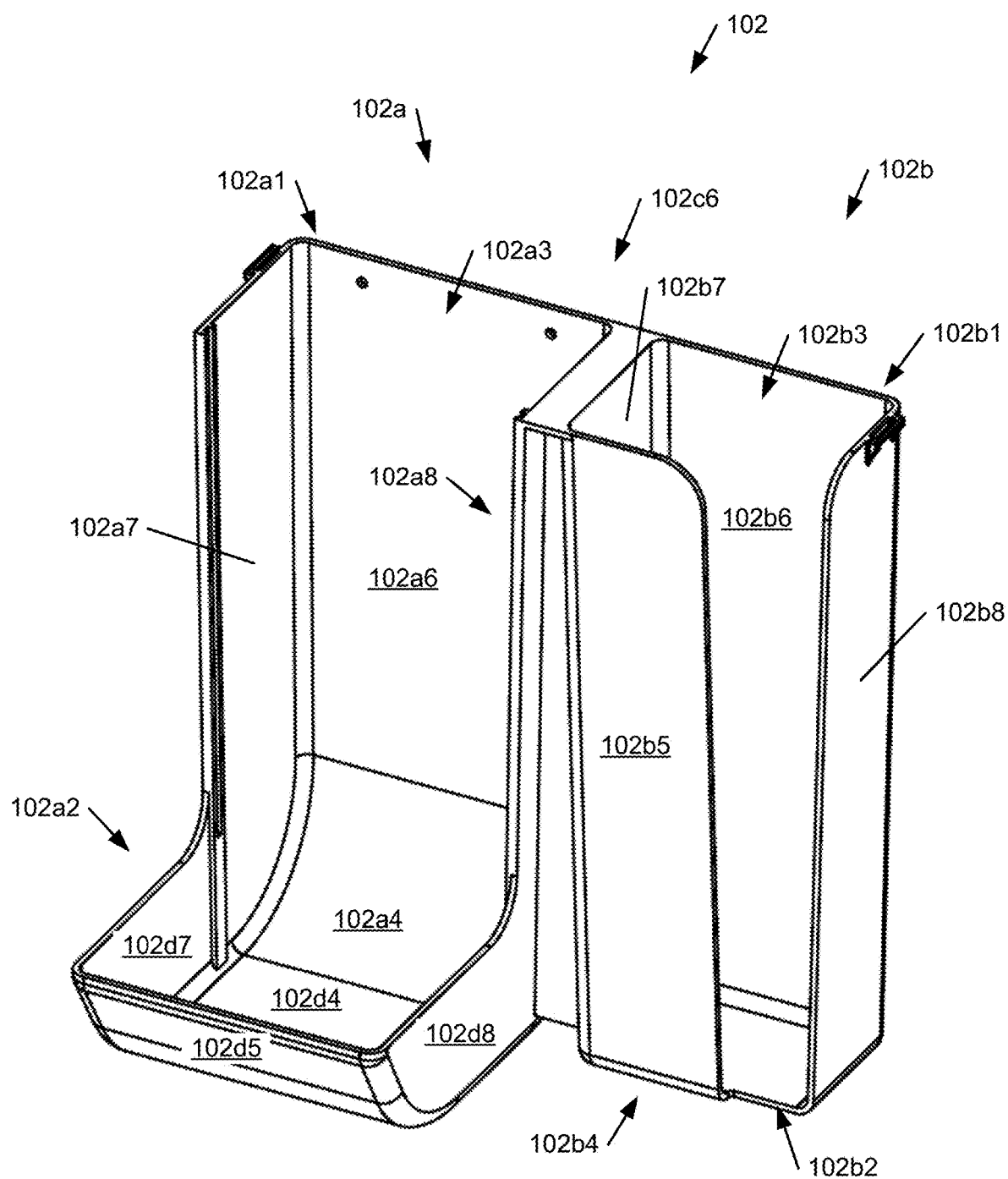
FIG. 2 illustrates an implementation of an example holder of the mobile pet feeder according to the present disclosure.

FIG. 2 illustrates an implementation of an example holder 102 of the mobile pet feeder 100 according to the present disclosure. In some implementations, as shown in FIGS. 1A, 1B, and 2, the holder 102 comprises a first section 102a, a second section 102b, a window 103, and a cover 104.

In some implementations, the first section 102a is configured to hold food for a pet. In some implementations, the first section 102a is configured to hold any other suitable content.

In some implementations, as shown in FIG. 2, the first section 102a comprises a top opening 102a1 and a tray opening 102a2.

In some implementations, the first section 102*a* and the second section 102*b* each have a rectangular prism shape and an interior 102*a*3, 102*b*3. In some implementations, the first section 102*a* and the second section 102*b* each comprise a top opening 102*a*1, 102*b*1, a bottom wall 102*a*4, 102*b*4, a front wall 102*a*5, 102*b*5, a back wall 102*a*6, 102*b*6, a left wall 102*a*7, 102*b*7, and a right wall 102*a*8, 102*b*8 together forming the rectangular prism shape and the interior 102*a*3, 102*b*3 of each respectively.

In some implementations, the front wall 102*a*5 of first section comprises a transparent window (such as the window 103 discussed below) configured to allow the viewing of the food in the interior 102*a*3 of the first section 102*a*.

In some implementations, the first section 102*a* and the second section 102*b* are side-by-side adjacent along the right wall 102*a*8 of the first section 102*a* and the left wall 102*b*7 of the second section 102*b*.

In some implementations, the holder 102 has an overall rectangular prism shape formed by the first section 102*a* and the second section 102*b*. In some implementations, the holder 102 comprises a back wall 102*c*6 formed by the back wall 102*a*6 of the first section 102*a* and the back wall 102*b*6 of the second section 102*b*.

In some implementations, the tray opening 102*a*2 extends from the front wall 102*a*5 of the first section adjacent 102*a* to the bottom wall 102*a*4 of the first section 102*a* In some implementations, the tray opening 102*a*2 is configured to hold and dispense food to a pet from the interior 102*a*3 of the first section 102*a*.

In some implementations, the tray opening 102*a*2 comprises a bottom wall 102*d*4 extending from the bottom wall 102*a*4 of the first section 102*a*. In some implementations, the tray opening 102*a*2 comprises a left wall 102*d*7 extending from the left wall 102*a*7 of the first section 102*a*. In some implementations, the tray opening 102*a*2 comprises a right wall 102*d*8 extending from the right wall 102*a*7 of the first section 102*a*. In some implementations, the tray opening 102*a*2 comprises a front wall 102*d*5 extending up from the bottom wall 102*d*4 of the tray opening 102*a*2 between the left wall 102*d*7 and the right wall 102*d*8 of the tray opening 102*a*2.

In some implementations, the back wall 102*a*6 of the first section 102*a* curve transitions to the bottom wall 102*a*4 of the first section 104 to allow or facilitate food for a pet to dispense from the interior 102*a*3 of the first section 102*a*.

In some implementations, the front wall 102*d*5 of the tray opening 102*a*2 of the first section 102 curve transitions to the bottom wall 102*d*4 of the tray opening 102*a*2 to allow or facilitate food for a pet to dispense from the tray opening 102*a*2.

In some implementations, the first section 102*a* is configured to be filled with food for a pet through the top opening 102*a*1. In some implementations, the first section 102*a* is configured to be filled with any other suitable content through the top opening 102*a*1.

In some implementations, the top opening 102*a*1 of the first section 102*a* is configured to receive the food for the pet into the interior 102*a*3 of the first section 102*a*.

In some implementations, the first section 102*a* is configured to dispense food for a pet from the tray opening 102*a*2. In some implementations, the first section 102*a* is configured to dispense any other suitable content from the tray opening 102*a*2.

Figure 4B:
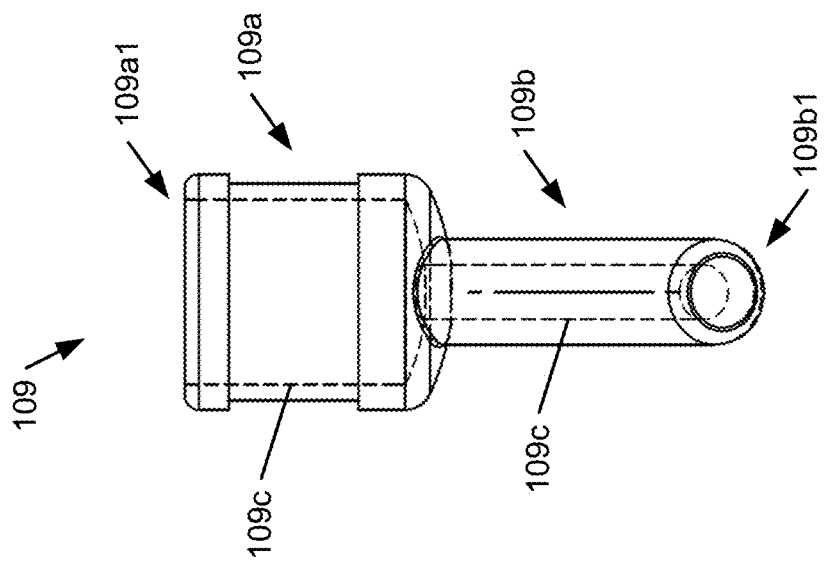
FIGS. 4A and 4B illustrate an implementation of an example water nozzle of the water container of the mobile pet feeder according to the present disclosure.
Figure 4A:
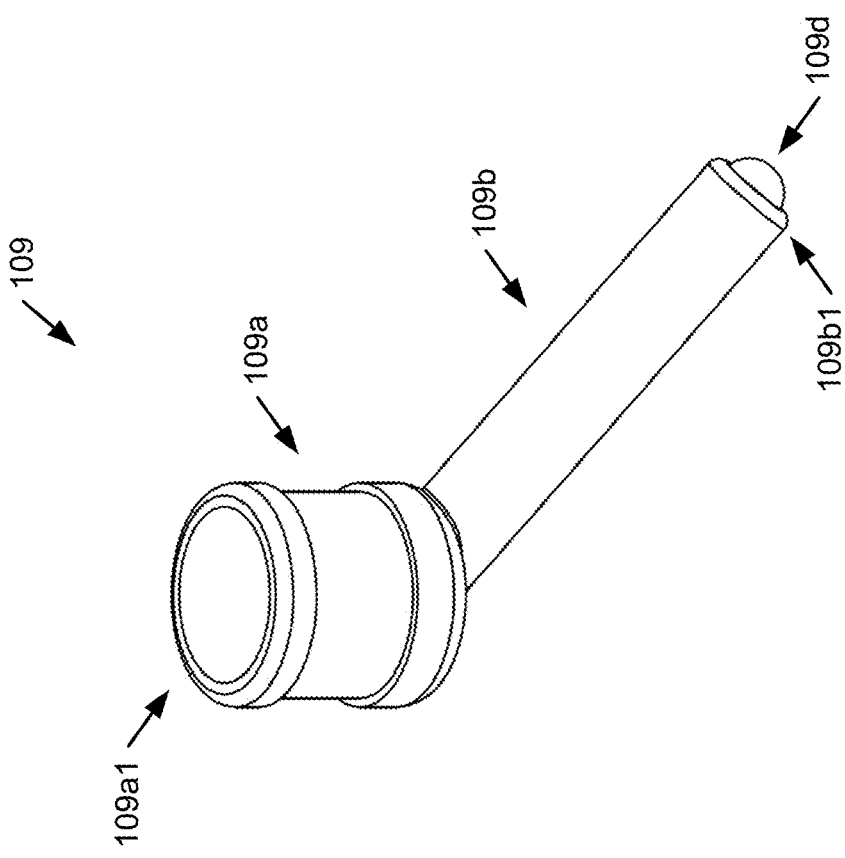

In some implementations, as shown in FIGS. 1 and 4A, the second section 102*b* is configured to hold the water container 101.

In some implementations, the second section 102*b* is configured to allow the water container 101 to be positioned in the second section 102*b*. In some implementations, the second section 102*b* is configured to allow the water container 101 to be removed from the second section 102*b*.

In some implementations, the top opening 102*b*1 of the second section 102*b* is configured to receive the water container 101 into the interior 102*b*3 of the second section 102*b*.

In some implementations, as shown in FIG. 2, the front wall 102*b*5 of the second section 102*b* comprises a water nozzle opening 102*b*2 configured to receive the water nozzle 109 and the drink opening 101*b* of the water container 101 extending from the water container 101 out of the interior 102*b*3 of the second section 102*b*.

In some implementations, the water nozzle opening 102*b*2 of the second section 102*b* is a slot opening 102*b*2 in the front wall 102*b*5 of the second section 102 extending from the bottom wall 102*b*4 to the top opening 102*b*1 of the second section 102*b*. In some implementations, this slot water nozzle opening 102*b*2 is configured to allow the water container 101 to be inserted into the interior 102*b*3 of the second section 102*b* with the water nozzle 109 and the drink opening 101*b* extending from the water container 101 out of the interior 102*b*3 of the second section 102*b*.

Figure 5:
FIG. 5 shows a front view of the mobile pet feeder illustrating an implementation of an example method of use according to the present disclosure.

In some implementations, as shown in FIGS. 1A, 1B, and 5, the window 103 is configured to securely attach to the first section 102*a* of the holder 102.

In some implementations, the window 103 and the first section 102*a* form the top opening 102*a*1 of the holder 102.

In some implementations, the window 103 is configured to hold food for a pet within the first section 102*a*. In some implementations, the window 103 is configured to hold any other suitable content within the first section 102*a*.

In some implementations, the window 103 is configured to provide visual access to food for a pet held within the first section 102*a*. For example, in some implementations, the window 103 is sufficiently transparent so that food contained in the first section 102*a* can be viewed through the window 103.

In some implementations, the window 103 is configured to provide visual access to any other suitable content held within the first section 102*a*.

Figure 6:
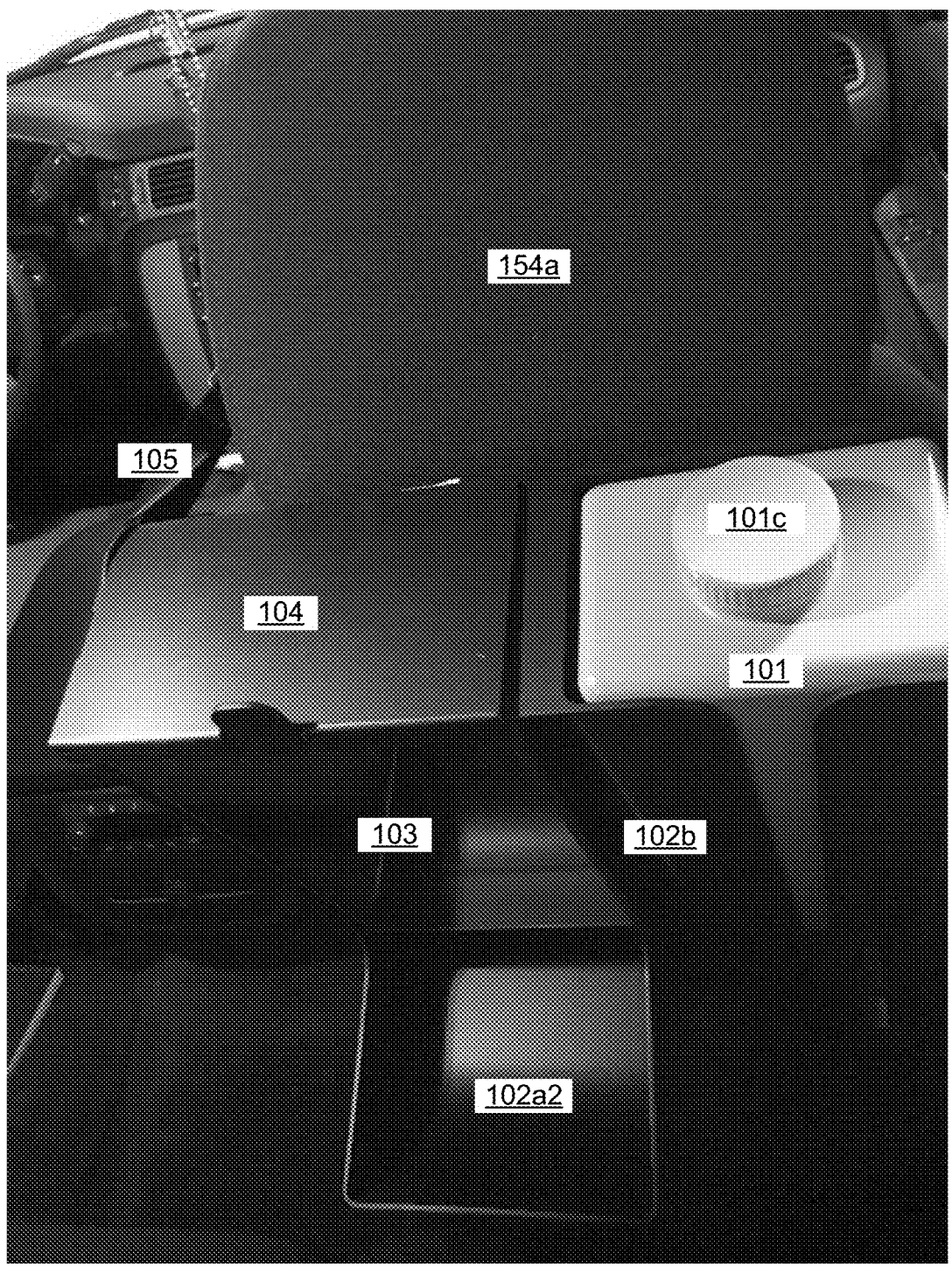
FIG. 6 shows a top view of the mobile pet feeder illustrating an implementation of an example method of use according to the present disclosure.

In some implementations, as shown in FIGS. 1A, 1B, and 6, the cover 104 is configured to cover the top opening 102*a*1 of the holder 102.

In some implementations, the cover 104 is configured to be positioned over the top opening 102*a*1 of the holder 102 to close the top opening 102*a*1 of the first section 102*a*. In some implementations, the cover 104 is configured to be removed from the top opening 102*a*1 to open the top opening 102*a*1.

Figure 3:
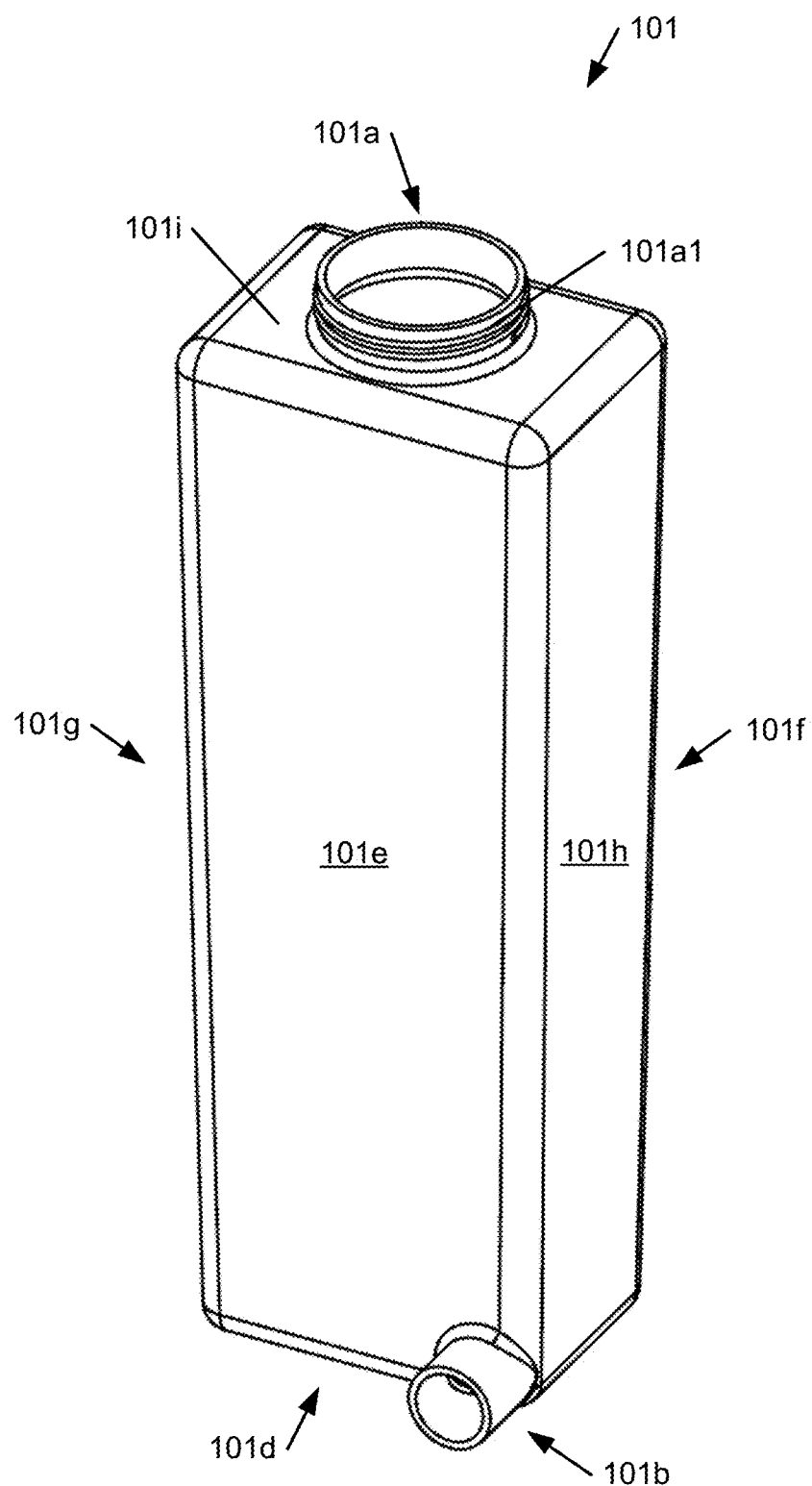
FIG. 3 illustrates an implementation of an example water container of the mobile pet feeder according to the present disclosure.

FIG. 3 illustrates an implementation of an example water container 101 of the mobile pet feeder 100 according to the present disclosure. In some implementations, as shown in FIGS. 1A, 3, and 6, the water container 101 comprises a fill opening 101*a*, a drink opening 101*b*, a cap 101*c*, and a water nozzle 109.

In some implementations, the water container 101 has a rectangular prism shape and an interior. In some implementations, the water container 101 comprises a top wall 101*i*, a bottom wall 101*d*, a front wall 101*e*, a back wall 101*f*, a left wall 101*g*, and a right wall 101*h* together forming the rectangular prism shape and the interior.

In some implementations, the water container 101 is configured to hold water. In some implementations, the water container 101 is configured to hold any other suitable fluid.

In some implementations, the water container 101 is configured to dispense water. In some implementations, the water container 101 is configured to dispense any other suitable fluid.

In some implementations, the water container 101 may be insulated. In some implementations, the water container 101 may be thermally insulated. In some implementations, the water container 101 may be insulated in any other suitable manner.

In some implementations, as shown in FIG. 2, the water container 101 is configured to be filled with water through the fill opening 101a. In some implementations, the water container 101 is configured to be filled with any other suitable fluid through the fill opening 101a.

In some implementations, the water container 101 is configured to be emptied of water through the fill opening 101a. In some implementations, the water container 101 is configured to be emptied of any other suitable fluid through the fill opening 101a.

In some implementations, the fill opening 101a is threaded. For example, in some implementations, the fill opening 101a comprises threads 101a1.

In some implementations, the threads 101a1 are configured to allow the cap 101c to be securely and removably attached from the fill opening 101a. In some implementations, the threads 101a1 are configured to allow the cap 101c to be removed from the fill opening 101a.

In some implementations, the fill opening is through the top wall 101i of the water container 101 and is configured to receive water into the interior.

In some implementations, the water container 101 is configured to dispense water through the drink opening 101b. For example, in some implementations, as described further below, the water container 101 is configured to dispense water through the drink opening 101b by way of the water nozzle 109 connected to the drink opening 101b.

In some implementations, the water container 101 is configured to dispense any other suitable fluid through the drink opening 101b.

In some implementations, the drink opening 101b is through the front wall 101e adjacent to the bottom wall 101d and is configured to release water out of the interior of the water container 101.

In some implementations, the drink opening 101b is configured to connect to the water nozzle 109 (described below). For example, in some implementations, the drink opening 101b comprises threads (not shown).

In some implementations, the threads (not shown) of the drink opening 101b are configured to allow the water nozzle 109 to be securely and removably attached from the fill opening 101a. In some implementations, the threads of the drink opening 101b are configured to allow the water nozzle 109 to be removed from the fill opening 101a.

In some implementations, as shown in FIG. 6, the cap 101c is configured to cover or close the fill opening 101a of the water container 101. In some implementations, the cap 101c is configured to seal the fill opening 101a. For example, in some implementations, the cap 101c is configured to prevent the release of water from the water container 101 through the fill opening 101a.

In some implementations, the cap 101c is configured to be positioned on the fill opening 101a of the water container 101 to close the fill opening 101a. In some implementations, the cap 101c is configured to be removed from the fill opening 101a to open the fill opening 101a.

In some implementations, the cap 101c is configured to be positioned on or removed from the fill opening 101a by the threads 101a1 of the fill opening 101a. For example, in some implementations, the cap 101c comprises threads (not shown) that are configured to mate with the fill opening threads 101a1.

In some implementations, the cap 101c is configured to be positioned on or removed from the fill opening 101a in any other suitable way.

FIGS. 4A and 4B illustrate an implementation of an example water nozzle 109 of the mobile pet feeder 100 according to the present disclosure. In some implementations, the water nozzle 109 comprises a connector 109a, a tube 109b, a flowpath 109c, and a stopper 109d.

In some implementations, the connector 109a and the tube 109b are connected together to form the water nozzle 109. In some implementations, the connector 109a and the tube 109b are connected together so that the length of the tube 109b extends at an angle from the length of the connector 109a.

In some implementations, the interior of the connector 109a and the interior of the tube 109b are connected together to form the flowpath 109c.

In some implementations, the connector 109a comprises an input opening 109a1.

In some implementations, the tube 109b comprises an output opening 109b1.

In some implementations, the water nozzle 109 is configured to allow water to flow through the flowpath 109f from the input opening 109a1 of the connector 109a to the output opening 109b1 of the tube 109b. In some implementations, the water nozzle 109 is configured to allow any other suitable to flow fluid through the flowpath 109f from the input opening 109a1 to the output opening 109b1.

In some implementations, as shown in FIG. 1A, the input opening 109a1 of the water nozzle 109 is configured to connect to the drink opening 101b of the water container 101. For example, in some implementations, the input opening 109a1 comprises threads (not shown) that are configured to mate with threads (not shown) of the drink opening 101b.

In some implementations, the input opening 109a1 is configured to connect to the drink opening 101b in any other suitable way.

In some implementations, as shown in FIG. 4A, the stopper 109d is contained in the tube 109b portion of the flowpath 109c. In some implementations, the stopper 109d is configured to extend partially out of the flowpath 109c through the output opening 109b1.

In some implementations, the stopper 109d comprises a round ball. In some implementations, the stopper 109d comprises a ball bearing.

In some implementations, the stopper 109d comprises any other suitable components.

In some implementations, the stopper 109d is configured to block the output opening 109b1. For example, in some implementations, the stopper 109d is configured to block the output opening 109b1 when no contact is made with the stopper 109d at the output opening 109b1, such as by a pet.

In some implementations, the stopper 109d is configured to unblock the output opening 109b1. For example, in some implementations, the stopper 109d is configured to unblock the output opening 109b1 when contact is made with the stopper 109d at the output opening 109b1, such as by a pet.

In some implementations, the stopper 109d is configured to prevent water from dispensing from the water container 101 through the flowpath 109c of the water nozzle 109 by blocking the output opening 109b1. In some implementations, the stopper 109d is configured to prevent any other suitable fluid from dispensing from the water container 101 through the flowpath 109c by blocking the output opening 109b1.

In some implementations, the stopper 109d is configured to allow water to dispense from the water container 101 through the flowpath 109c of the water nozzle 109 by unblocking the output opening 109b1. In some implementations, the stopper 109d is configured to allow any other suitable fluid to dispense from the water container 101 through the flowpath 109c by unblocking the output opening 109b1.

In some implementations, the water nozzle 109 is a no-drip pet water nozzle or similar pet water nozzle device.

In some implementations, as shown in FIGS. 1A and 1B, the upper strap 105 is configured to securely and removably attach to the holder 102.

In some implementations, the upper strap 105 is configured to hold the mobile pet feeder 100 in a position.

Figure 8:
FIG. 8 shows a view of the upper and lower straps of the mobile pet feeder illustrating an implementation of an example method of use according to the present disclosure.

In some implementations, as shown in FIG. 8, the upper strap 105 is configured to attach the mobile pet feeder 100 to a headrest 154a of a vehicle front seat 154.

Figure 7:
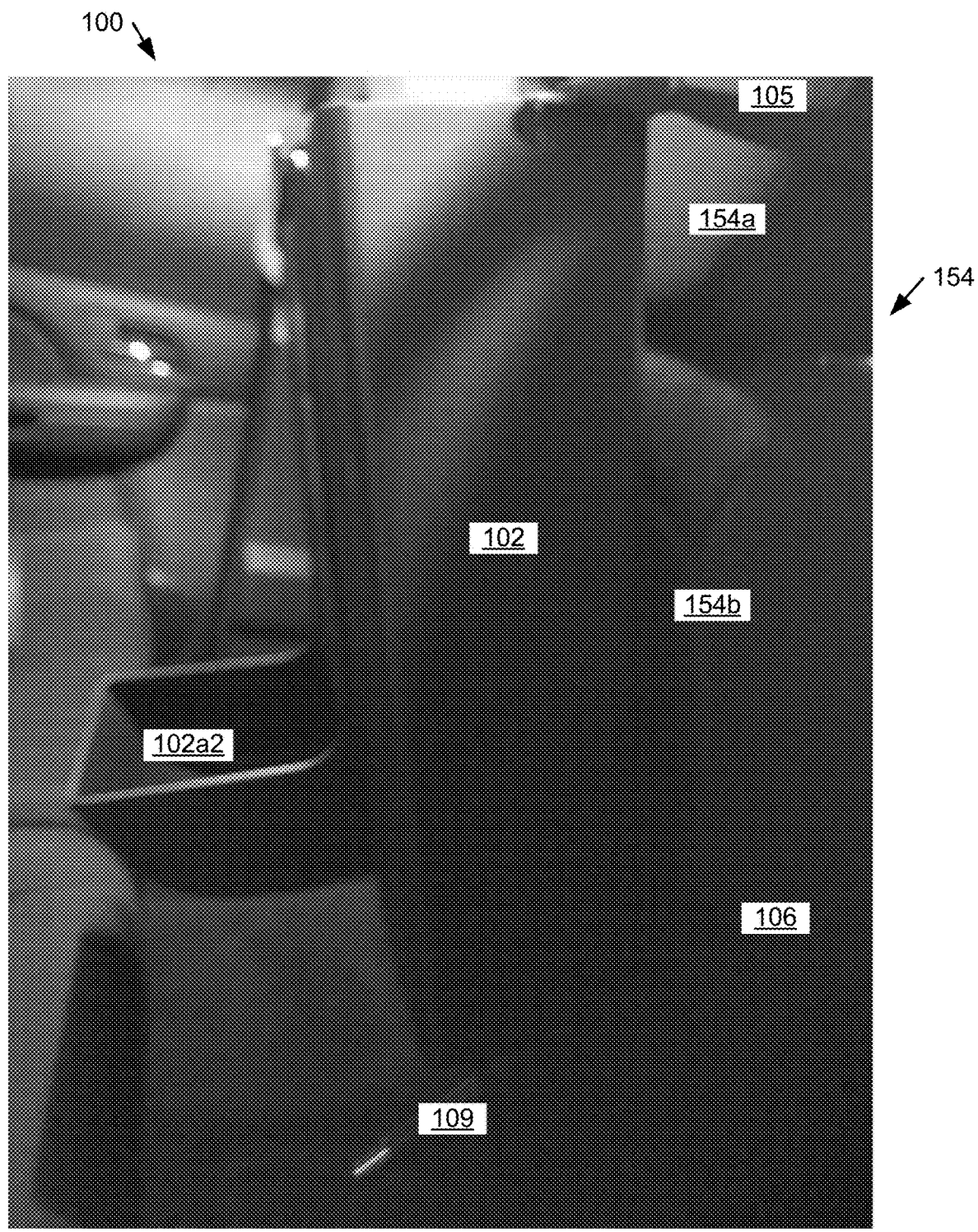
FIG. 7 shows a side view of the mobile pet feeder illustrating an implementation of an example method of use according to the present disclosure.

In some implementations, as shown in FIG. 7, the upper strap 105 is configured to attach the mobile pet feeder 100 to the headrest 154a with the mobile pet feeder 100 positioned on the backside or seatback 154b of the vehicle front seat 154.

In some implementations, the upper strap 105 is configured to attach the mobile pet feeder 100 to the vehicle front seat 154 with the mobile pet feeder 100 positioned in any other suitable position in the vehicle.

In some implementations, as shown in FIGS. 1A and 1B, the lower strap 106 is also configured to securely and removably attach to the holder 102.

In some implementations, the lower strap 106 is also configured to hold the mobile pet feeder 100 in a position.

In some implementations, as shown in FIG. 8, the lower strap 106 is configured to attach the mobile pet feeder 100 to the backside or seatback 154b of the vehicle front seat 154.

In some implementations, as shown in FIG. 7, the lower strap 106 is configured to attach the mobile pet feeder 100 to the seatback 154b with the mobile pet feeder 100 positioned on the backside 154b of the vehicle front seat 154.

In some implementations, the lower strap 106 is configured to attach the mobile pet feeder 100 with the mobile pet feeder 100 positioned in any other suitable position in the vehicle.

In some implementations, the upper strap 105 and the lower strap 106 are each attached to the holder 102. In some implementations, the upper strap 105 and the lower strap 106 are each configured to position and attach the holder 102 to the back side 154b of a seat 154 of a vehicle with the back wall 102c6 of the holder 102 positioned adjacent to the back side 154b of the seat 154.

In some implementations, the upper strap 105 comprises a first end 105a attached to the left wall 102a7 of the first section 102a adjacent to the top opening 102a1 of the first section 102a. In some implementations, the upper strap 105 comprises a second end 105b attached to the right wall 102b8 of the second section 102b adjacent to the top opening 102b1 of the second section 102b.

In some implementations, the lower strap 106 comprises a first end 106a attached to the left wall 102a7 of the first section 102a adjacent to the bottom wall 102a4 of the first section 102a. In some implementations, the lower strap 106 comprises a second end 106b attached to the right wall 102b8 of the second section 102b adjacent to the bottom wall 102b4 of the second section 102b.

In some implementations, as shown in FIG. 1A, the upper strap 105 may comprise an upper adjustment buckle 105c. Similarly, in some implementations, the lower strap 106 may comprise a lower adjustment buckle 106c.

In some implementations, the upper adjustment buckle 105c is configured to adjust the length of the upper strap 105. Similarly, in some implementations, the lower adjustment buckle 106c is configured to adjust the length of the lower strap 106.

In some implementations, the mobile pet feeder 100 may comprise just a single strap (not shown) that is the same or similar to the upper strap 105 and/or the lower strap 106.

In some implementations, the mobile pet feeder 100 may comprise one or more other straps (not shown) in addition to the upper strap 105 and/or the lower strap 106 that are each the same or similar to the upper strap 105 and/or the lower strap 106.

In some implementations, the mobile pet feeder 100 may comprise additional parts (not shown), such as rivets and washers. In some implementations, such additional parts are configured to connect components of the mobile pet feeder 100, such as the above described components.

In some implementations, the mobile pet feeder 100 and/or the components of the mobile pet feeder 100 comprise any suitable dimensions.

In some implementations, the mobile pet feeder 100 and/or the components of the mobile pet feeder 100 is composed of any suitable material.

In some implementations, the mobile pet feeder 100 and/or the components of the mobile pet feeder 100 can have any suitable appearance.

FIGS. 5-8 illustrate implementations of an example method of use of the mobile pet feeder 100 according to the present disclosure.

In some implementations, the mobile pet feeder 100 is positioned on a seat 154 of the vehicle by the upper strap 105 of the mobile pet feeder 100. In some implementations, the mobile pet feeder 100 is positioned on the seat 154 of the vehicle by the lower strap 106 of the mobile pet feeder 100.

In some implementations, the mobile pet feeder 100 is attached to the seat 154 of the vehicle by the upper strap 105 of the mobile pet feeder 100. In some implementations, the mobile pet feeder 100 is attached to the seat 154 of the vehicle by the lower strap 106 of the mobile pet feeder 100.

In some implementations, the length of the upper strap 105 is adjusted (i.e., decreased or increased) with the upper adjustment buckle 105c. Similarly, in some implementations, the length of the lower strap 106 is adjusted with the lower adjustment buckle 106c.

In some implementations, the cover 104 is removed from the top opening 102a1 of the holder 102 to open the first section 102a of the holder 102.

In some implementations, the first section 102a is filled with food for a pet through the top opening 102a1.

In some implementations, the cover 104 is positioned over the top opening 102a1 of the holder 102 to close the first section 102a.

In some implementations, the food for a pet is held within the first section 102a by the window 103.

In some implementations, the food for a pet is viewed within the first section 102a through the window 103.

In some implementations, the water container 101 is removed from the second section 102b of the holder 102.

In some implementations, the cap 101c is removed from the fill opening 101a of the water container 101 to open the fill opening 101a.

In some implementations, the water container 101 is filled with water through the fill opening 101a of the water container 101.

In some implementations, the cap 101c is positioned on the fill opening 101a of the water container 101 to close the fill opening 101a.

In some implementations, the water container 101 is replaced to the second section 102b of the holder 102.

In some implementations, the food for the pet is dispensed from the tray opening 102a2 of the first section 102a of the holder 102.

In some implementations, the water is dispensed from the water container 101 through the drink opening 101b. In some implementations, the water is dispensed from the drink opening 101b of the water container 101 into the flowpath 109c of the water nozzle 109.

In some implementations, the water is dispensed from the drink opening 101b into the flowpath 109c through the input opening 109a1 of the water nozzle 109.

In some implementations, the water is held in the flowpath 109c at the output opening 109b1 by the stopper 109d of the water nozzle 109.

In some implementations, the water is released from the flowpath 109c through the output opening 109b1 of the water nozzle 109 by the stopper 109d.

In some implementations, the water is released from the flowpath 109c through the output opening 109b1 when a pet contacts the stopper 109d to drink from the water nozzle 109. In some implementations, the contact of the stopper 109d by the pet moves the stopper 109d into the flowpath 109c away from the output opening 109b1. In some implementations, the moving of the stopper 109d into the flowpath 109c thereby unblocks the output opening 109b1 to allow the release of the water.

The figures, including photographs and drawings, comprised herewith may represent one or more implementations of the mobile pet feeder.

Details shown in the figures, such as dimensions, descriptions, etc., are exemplary, and there may be implementations of other suitable details according to the present disclosure.

Reference throughout this specification to "an embodiment" or "implementation" or words of similar import means that a particular described feature, structure, or characteristic is comprised in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations may be depicted in the drawings in a particular order, this should not be understood as requiring that such operations be performed in the particular order shown or in sequential order, or that all illustrated operations be performed, to achieve desirable results.

The invention claimed is:

1. A mobile pet feeder for feeding pets in vehicles, comprising:
　a water container configured to hold water for a pet and to dispense the water to the pet, wherein
　the water container has a rectangular prism shape and an interior, and comprises:
　　a top wall, a bottom wall, a front wall, a back wall, a left wall, and a right wall together forming the rectangular prism shape and the interior;
　　a fill opening through the top wall configured to receive the water into the interior;
　　a cap configured to securely and removably attach to the fill opening to close the fill opening;
　　a drink opening through the front wall adjacent to the bottom wall and configured to release the water out of the interior;
　　a water nozzle securely attached to the drink opening and configured to dispense the water to the pet from the drink opening when the pet contacts the water nozzle;
　a holder that comprises a first section configured to hold food for the pet and dispense the food to the pet, and a second section configured to hold the water container, wherein:
　　the first section and the second section each have a rectangular prism shape and an interior, and each comprise a top opening, a bottom wall, a front wall, a back wall, a left wall, and a right wall together forming the rectangular prism shape and the interior;
　　the first section and the second section are side-by-side adjacent along the right wall of the first section and the left wall of the second section;
　　the first section comprises a cover configured to securely and removably attach to the first section to close the top opening;
　　the top opening of the first section is configured to receive the food for the pet into the interior of the first section;
　　the first section comprises a tray opening extending from the front wall of the first section adjacent to the bottom wall of the first section, wherein the tray opening is configured to hold and dispense the food to the pet from the interior of the first section, and the tray opening comprises:
　　　a bottom wall extending from the bottom wall of the first section;
　　　a left wall extending from the left wall of the first section;
　　　a right wall extending from the right wall of the first section; and
　　　a front wall extending up from the bottom wall of the tray opening between the left wall and the right wall of the tray opening;
　　the top opening of the second section is configured to receive the water container into the interior of the second section;
　　the front wall of the second section comprises a water nozzle opening configured to receive the water nozzle and the drink opening of the water container extending from the water container out of the interior of the second section; and the holder has an overall rectangular prism shape formed by the first section and the second section and the holder comprises a back wall formed by the back wall of the first section and the back wall of the second section; and an upper strap and a lower strap each attached to the holder and configured to position and attach the holder to the back side of a seat of a vehicle with the back wall of the holder positioned adjacent to the back side of the seat, wherein:

the upper strap comprises a first end attached to the left wall of the first section adjacent to the top opening of the first section, and a second end attached to the right wall of the second section adjacent to the top opening of the second section; and the lower strap comprises a first end attached to the left wall of the first section adjacent to the bottom wall of the first section, and a second end attached to the right wall of the second section adjacent to the bottom wall of the second section.

2. The mobile pet feeder of claim 1, wherein the water nozzle of the water container comprises:

a connector comprising an input opening configured to securely attach to the drink opening of the water container;

a tube extending from the connector and comprising an output opening configured to dispense the water to the pet from the water nozzle;

a flowpath extending from the input opening through the connector and the tube to the output opening and configured to allow the water to flow from the input opening to the output opening; and a stopper within the flowpath at the tube and configured to block the output opening to prevent the water from flowing out of the flowpath and to unblock the output opening to allow the water to flow out of the flowpath when the pet contacts the tube at the output opening.

3. The mobile pet feeder of claim 1, wherein the water nozzle is configured to securely and removably attach to the drink opening of the water container.

4. The mobile pet feeder of claim 1, wherein the front wall of first section comprises a transparent window configured to allow the viewing of the food in the interior of the first section.

5. The mobile pet feeder of claim 1, wherein the water nozzle opening of the second section is a slot opening in the front wall of the second section extending from the bottom wall of the second section to the top opening of the second section and configured to allow the water container to be inserted into the interior of the second section with the water nozzle and the drink opening of the water container extending from the water container out of the interior of the second section.

6. The mobile pet feeder of claim 1, wherein the back wall of the first section curve transitions to the bottom wall of the first section to allow the food to dispense from the interior of the first section.

7. The mobile pet feeder of claim 1, wherein the front wall of the tray opening of the first section curve transitions to the bottom wall of the tray opening to allow the food to dispense from the tray opening.

8. The mobile pet feeder of claim 1, wherein the upper strap comprises an upper adjustment buckle configured to adjust the length of the upper strap, and the lower strap comprises a lower adjustment buckle configured to adjust the length of the lower strap.

9. A method of using the mobile pet feeder of claim 8, comprising adjusting the length of the upper strap with the upper adjustment buckle, and adjusting the length of the lower strap with the lower adjustment buckle.

10. The mobile pet feeder of claim 1, wherein the upper strap and the lower strap are each securely and removably attached to the holder.

11. A method of using the mobile pet feeder of claim 1, comprising positioning and attaching the holder with the upper strap and the lower strap to the back side of the seat of the vehicle with the back wall of the holder positioned adjacent to the back side of the seat.

12. The method of claim 11, further comprising placing the food for the pet in the interior of the first section through the top opening of the first section, and securely attaching the cover to the first section to close the top opening of the first section.

13. The method of claim 12, further comprising dispensing the food to the pet from the interior of the first section through the tray opening of the first section.

14. The method of claim 11, further comprising placing the water for the pet in the interior of the water container through the fill opening of the water container, and securely attaching the cap to the fill opening to close the fill opening.

15. The method of claim 14, further comprising dispensing the water to the pet from the interior of the water container through the water nozzle when the pet contacts the water nozzle.

\* \* \* \* \*